US009358482B2

(12) United States Patent
Morgan

(10) Patent No.: US 9,358,482 B2
(45) Date of Patent: Jun. 7, 2016

(54) FILTRATION AND DEWATERING APPARATUS

(75) Inventor: Gregory Richard Morgan, Auckland (NZ)

(73) Assignee: LIQUIDSTRIP LIMITED, Auckland (NZ)

(*) Notice: Subject to any disclaimer, the term of this patent is extended or adjusted under 35 U.S.C. 154(b) by 524 days.

(21) Appl. No.: 13/381,743

(22) PCT Filed: Jul. 1, 2010

(86) PCT No.: PCT/NZ2010/000134
§ 371 (c)(1),
(2), (4) Date: Dec. 30, 2011

(87) PCT Pub. No.: WO2011/002317
PCT Pub. Date: Jan. 6, 2011

(65) Prior Publication Data
US 2012/0103920 A1    May 3, 2012

(30) Foreign Application Priority Data
Jul. 1, 2009    (NZ) .......................... 578111

(51) Int. Cl.
B01D 29/94    (2006.01)
B01D 29/35    (2006.01)
B01D 29/64    (2006.01)
B01D 35/26    (2006.01)

(52) U.S. Cl.
CPC .............. *B01D 29/35* (2013.01); *B01D 29/356* (2013.01); *B01D 29/6476* (2013.01); *B01D 29/94* (2013.01); *B01D 35/26* (2013.01)

(58) Field of Classification Search
None
See application file for complete search history.

(56) References Cited

U.S. PATENT DOCUMENTS 3,143,956 A    8/1964  Hurtig
3,235,087 A    2/1966  Andrews et al.
(Continued)

FOREIGN PATENT DOCUMENTS

DE    2550021    7/1977
EP    0473975    3/1992
(Continued)

OTHER PUBLICATIONS

Support. (n.d.). The American Heritage® Stedman's Medical Dictionary. Retrieved Jan. 6, 2015, from Dictionary.com website: http://dictionary.reference.com/browse/support.*
(Continued)

*Primary Examiner* — Katherine Zalasky
*Assistant Examiner* — Kara Graber
(74) *Attorney, Agent, or Firm* — Greer, Burns & Crain, Ltd.

(57) ABSTRACT

A filtration apparatus which has a filtration chamber, and the filtration chamber has a fluid inlet, a filtered fluid outlet, a residue outlet, and a filtering element. The filtering element is situated between the fluid inlet and the filtered fluid outlet. The apparatus also includes a wiping member which is situated within, or about, the filtering element and which is adapted to wipe the surface of the filtering element. The wiping member also wipes any residue toward the residue outlet when the apparatus is in use. The filtration apparatus includes a first pumping configured to create a flow toward the filtering chamber, and a second pumping situated within the filtering chamber and configured to induce a counter-flow back toward the first pumping.

5 Claims, 7 Drawing Sheets

(56) References Cited

U.S. PATENT DOCUMENTS

Figure 1:
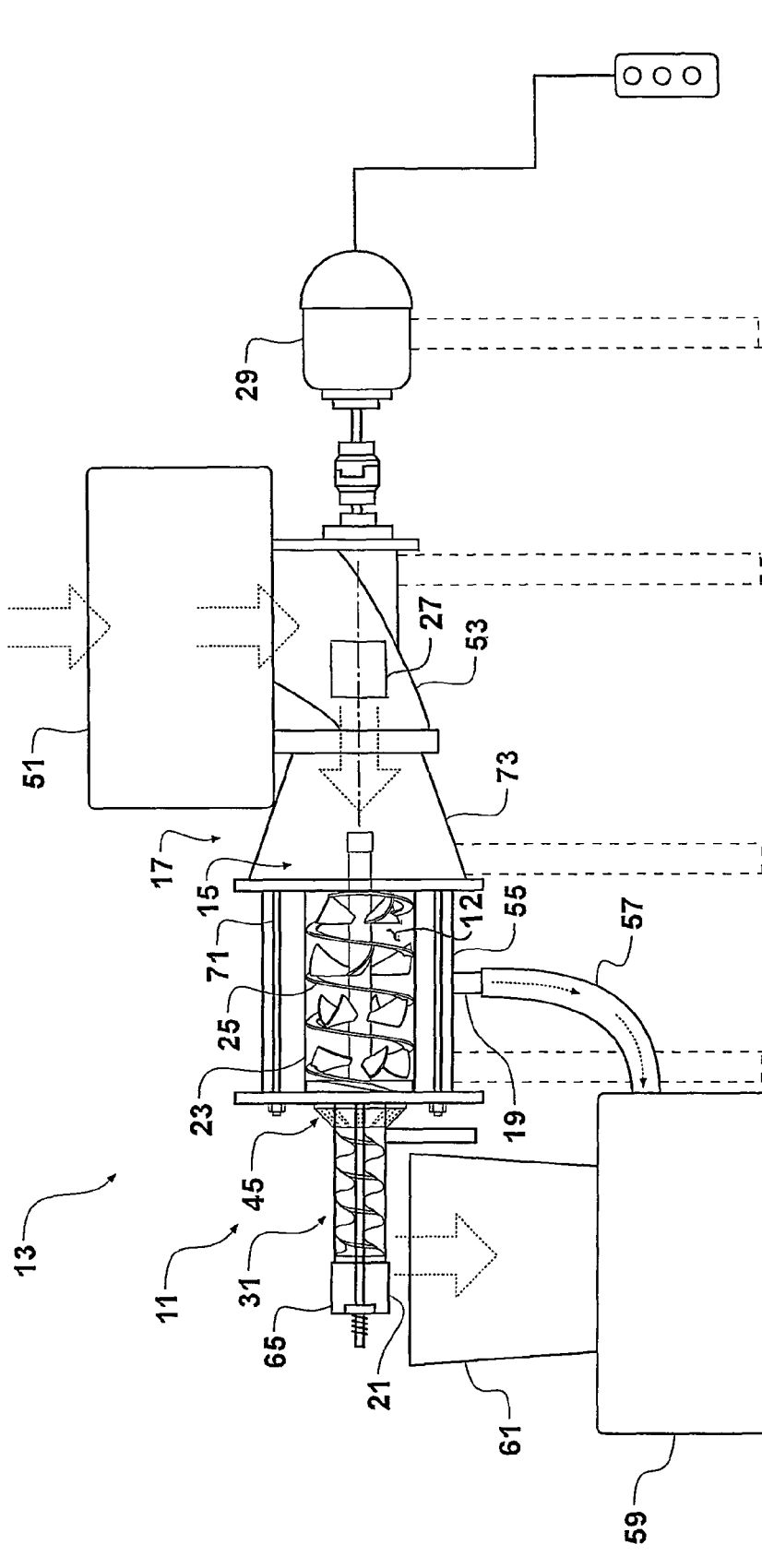

| | | |
|---|---|---|
| 4,774,008 A | 9/1988 | Roodenrijs |
| 4,875,344 A * | 10/1989 | Zittel .............................. 62/381 |
| 5,186,834 A | 2/1993 | Arai |
| 5,435,917 A | 7/1995 | Sato |
| 5,510,030 A | 4/1996 | Bacher et al. |
| 5,669,291 A | 9/1997 | Ii |
| 6,615,710 B1 | 9/2003 | Ishigaki et al. |
| 6,634,508 B1 | 10/2003 | Ishigaki |
| 7,461,591 B2 | 12/2008 | Babbini |
| 7,918,347 B2 | 4/2011 | Geisbauer |
| 2008/0093297 A1 | 4/2008 | Gock et al. |
| 2008/0156745 A1 * | 7/2008 | Zha et al. ...................... 210/791 |

FOREIGN PATENT DOCUMENTS

| | | |
|---|---|---|
| FR | 864166 | 4/1941 |
| JP | 55145516 | 11/1980 |
| JP | 2002307194 | 10/2002 |

OTHER PUBLICATIONS

Extended European Search Report for PCT/NZ2010/000134, Dated Nov. 27, 2012, 6 Pages.

International Search Report for PCT/NZ2010/000134, Completed by the Australian Patent Office on Sep. 10, 2010, 2 Pages.

\* cited by examiner

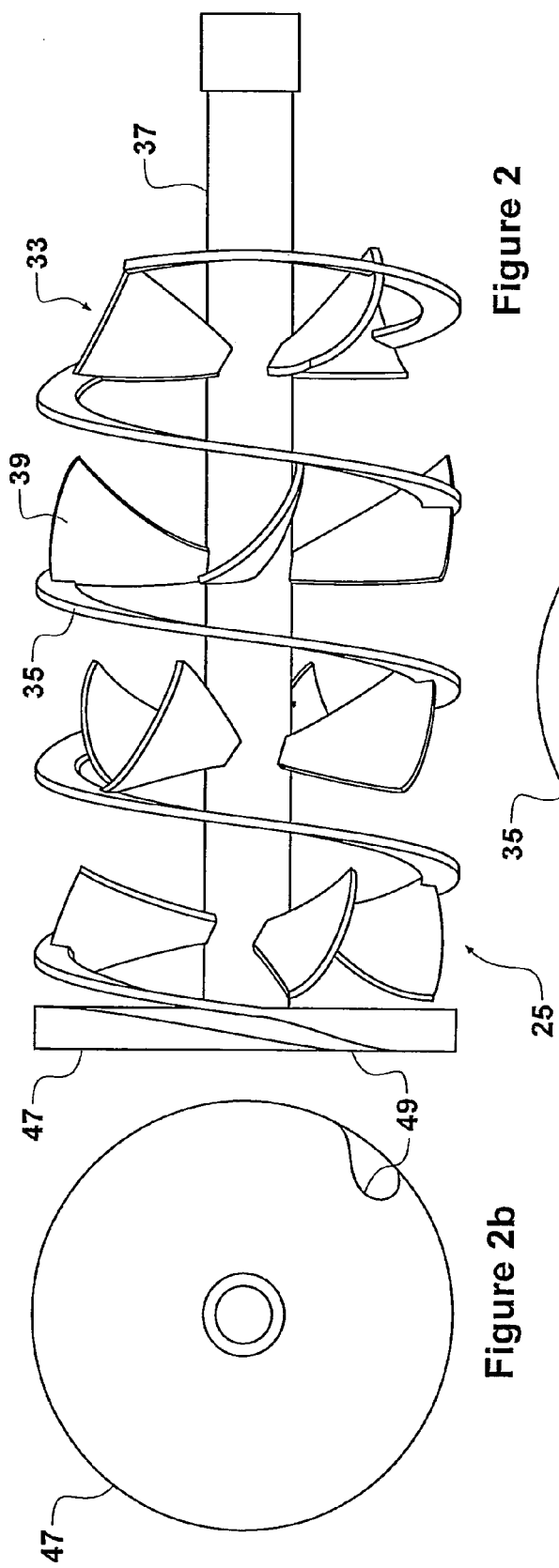
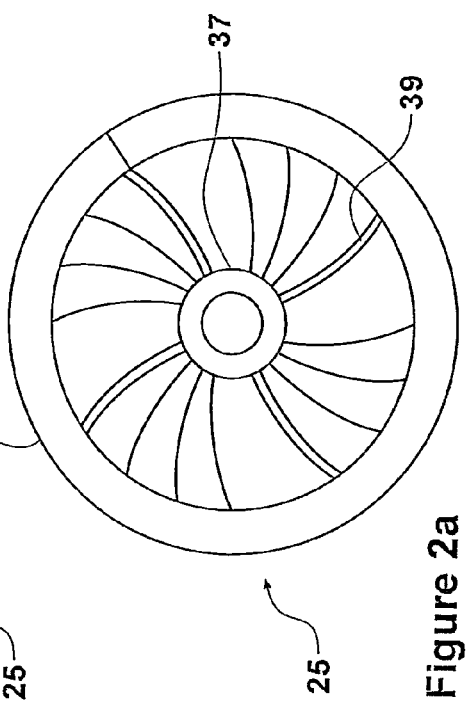
Figure 2
Figure 2a
Figure 2b

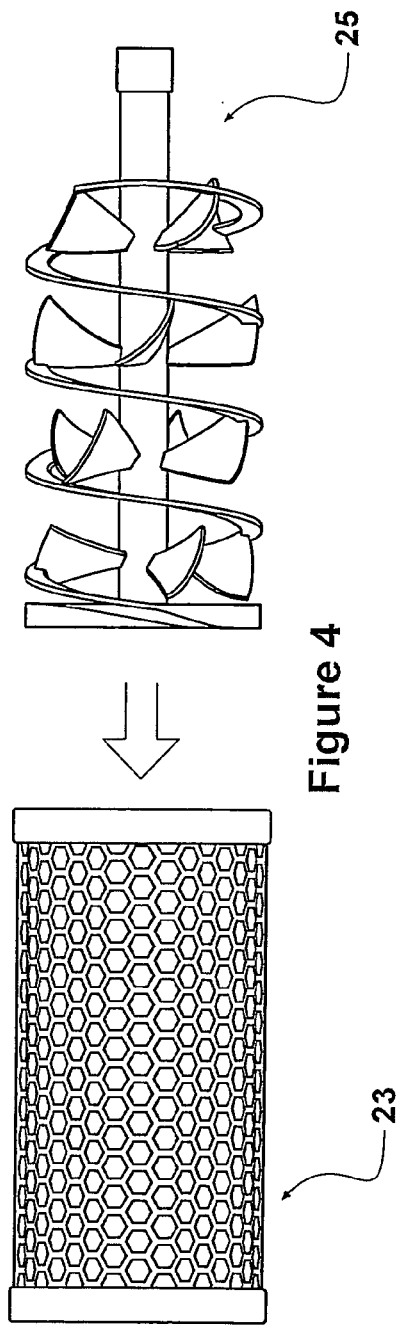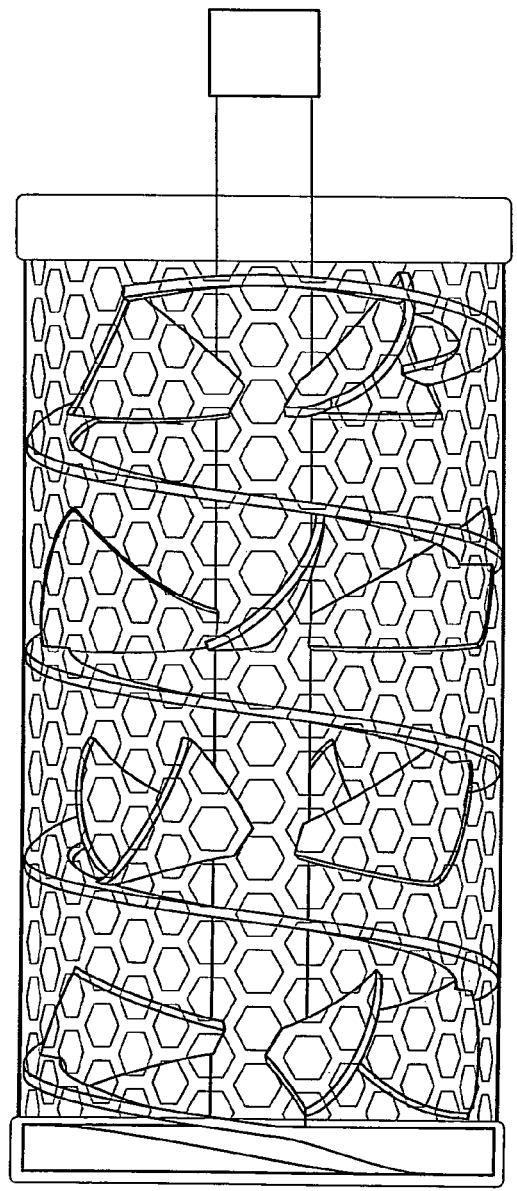

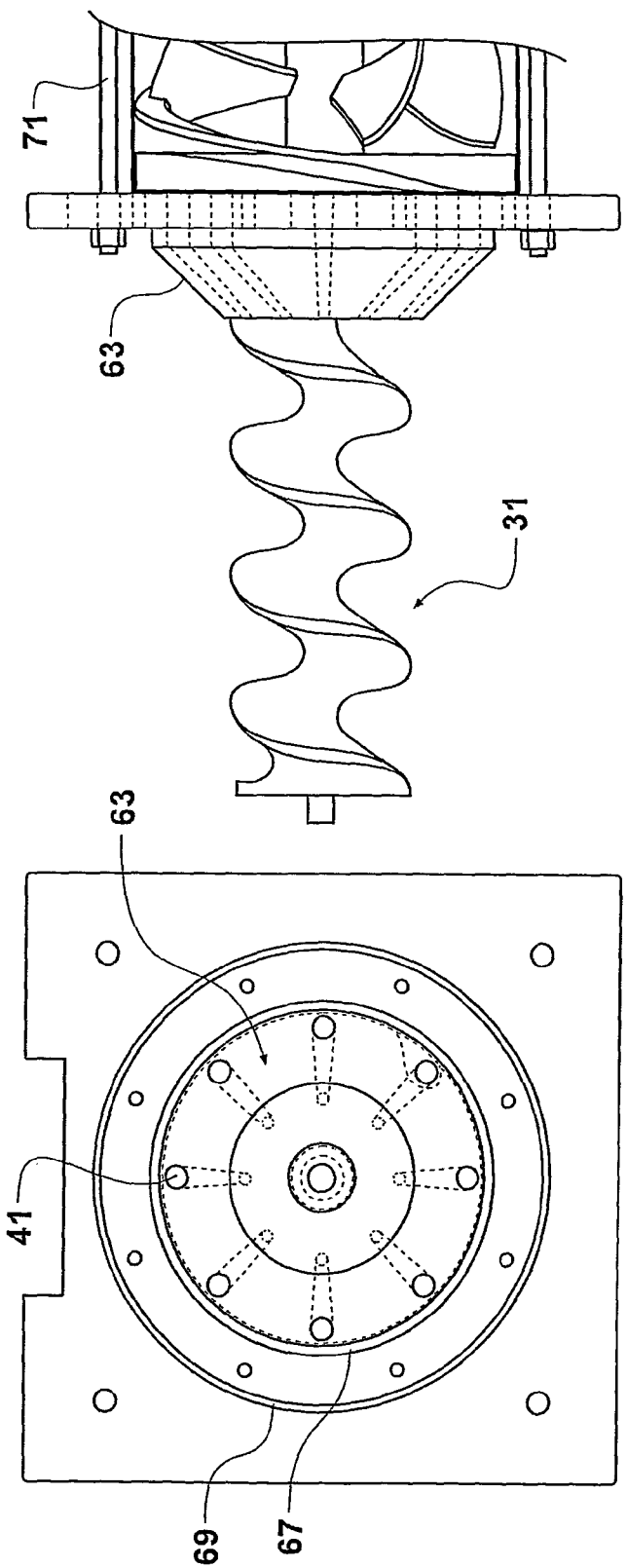

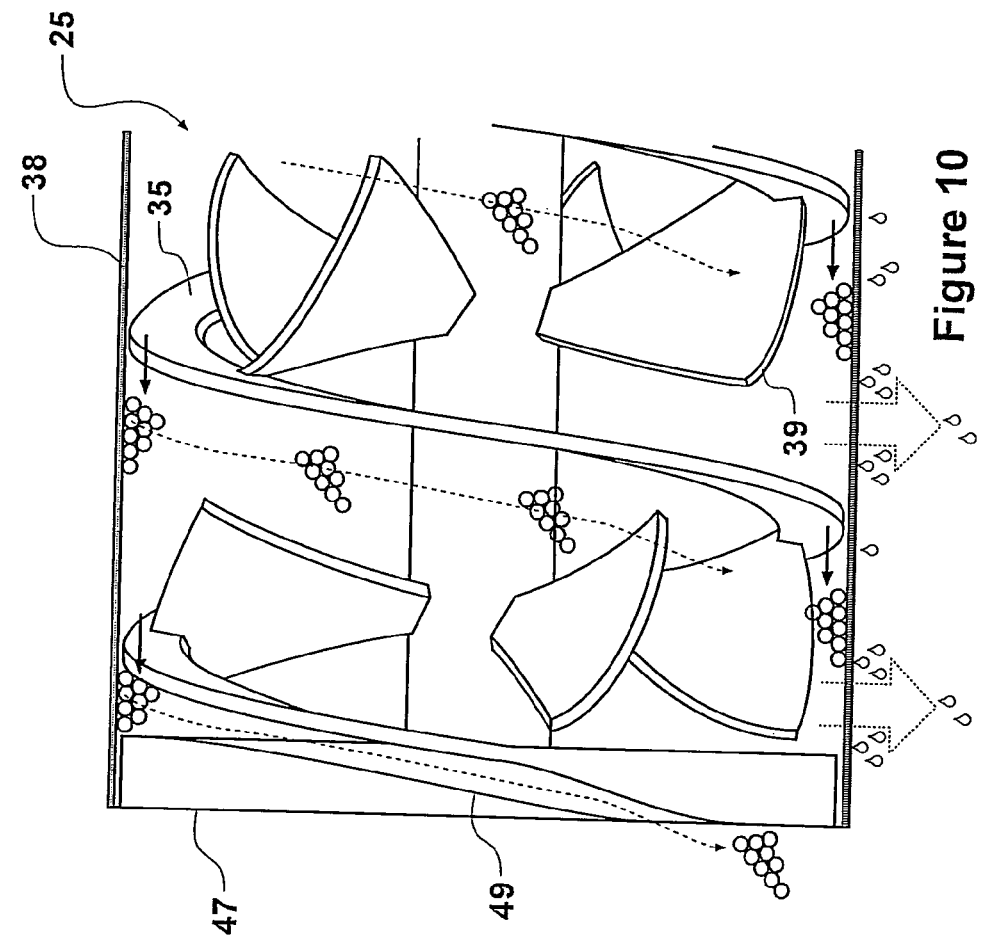
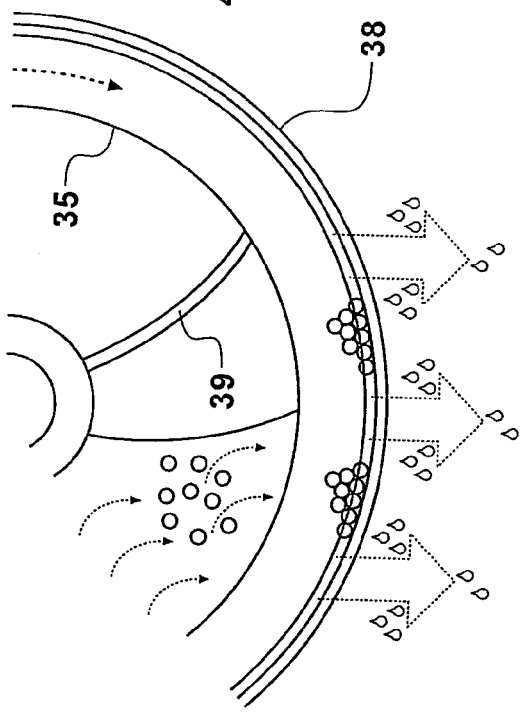
Figure 10
Figure 9

US 9,358,482 B2

FILTRATION AND DEWATERING APPARATUS

CROSS-REFERENCE TO RELATED APPLICATION

This application is the U.S. national phase of PCT Appln. No. PCT/NZ2010/000134 filed Jul. 1, 2010 which claims priority to New Zealand application 578111 filed Jul. 1, 2009, the disclosures of which are incorporated in their entirety by reference herein.

FIELD OF THE INVENTION

This invention relates to filtration and dewatering apparatus, and in particular, but not exclusively to filtration apparatus for filtering juices in the beverage industry, and dewatering apparatus for dewatering effluent.

BACKGROUND

It is often necessary to filter juices and other liquids during processing. For example, in the wine industry, to produce a high quality and visually appealing wine, it is necessary to filter the juices after they are extracted from the fruit.

After crushing the grapes the juice is generally allowed to settle for a period of days or weeks to allow the solids to settle out. And to avoid spoiling the juice it is necessary to chill it during this time while the settling occurs.

There are costs associated with storing the large quantities of juice and with chilling the juice. Also, the juice can degrade to some extent while it is held for an extended period waiting for the settling to occur, for example the juices can begin to oxidise and become spoiled. And in addition, the waiting period slows down the wine making process.

While fine mesh or screen filters are suitable for separating small solid particles from fluids, they generally require frequent cleaning if the fluids contains a high percentage of solids. Extracting solids from fruit juices is a classic example of this situation.

Similarly, the dewatering of effluent, for example effluent on a dairy farm, is a challenging task. The large volumes involved, and the fineness of the solids, requires dewatering apparatus with fine filtration abilities and yet the ability to perform efficiently while processing the large volumes of effluent.

To deal with these problems a range of filtering options have been used in the past. The most commonly used filtering methods tend to require the use of flocculants and/or expensive non-reusable filtration mediums. The flocculants can degrade the final product to some extent, and the used flocculants produce an additional waste disposal problem.

What is needed is an efficient filtration apparatus, which is capable of adequately filtering large quantities of juices, and which minimises or eliminates the need to use flocculants, and which minimises or eliminates the need to use throwaway filtering media.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT

It is therefore an object of the present invention to provide a filtration or dewatering apparatus which will at least go some way towards overcoming the above mentioned problems, or at least provide the public with a useful choice.

STATEMENTS OF THE INVENTION

Accordingly, in a first aspect, the invention may broadly be said to consist in a filtration apparatus having a filtration chamber, the filtration chamber having a fluid inlet, a filtered fluid outlet, a residue outlet, and a filtering element which is situated between the fluid inlet and the filtered fluid outlet, and the apparatus also having a wiping member situated within, or about, the filtering element and adapted to wipe the surface of the filtering element and to wipe residue toward the residue outlet when the apparatus is in use.

Preferably the apparatus further includes fluid directing means adapted to induce swirling of a fluid within, or about, the filtering element when the apparatus is in use.

Preferably the apparatus includes a first pumping means configured to create a flow toward the filtering chamber, and a second pumping means situated within the filtering chamber and configured to induce a counter-flow back toward the first pumping means.

Preferably the apparatus further includes a centrifugal impellor situated within the filtering chamber.

Preferably the filtering element is cylindrical or conical shaped.

Preferably the wiping member is a substantially helically shaped wiper.

Preferably the wiping member is rotatable about an axis that is common with a central axis of the filtering element.

Preferably the filtering element includes a fine mesh screen.

Preferably the apparatus includes a rotary valve which is configured to control the flow of residue out of the filtering chamber.

Preferably the residue outlet includes one or more restrictor orifices that are configured to allow residue to exit through the or each orifice while maintaining a pressure within the filtering chamber.

Optionally the residue outlet includes one or more variable sized outlet holes or orifices.

Preferably the residue outlet is provided with a valve means which is adapted to control the flow of residue out through the outlet when the apparatus is in use.

Preferably the valve means includes a rotatable valve member.

Preferably the rotatable valve member includes one or more passages which are adapted to communicate with the or each orifice of the residue outlet, when alignment of the passage or passages with an orifice occurs, as the rotatable valve member rotates when the apparatus is in use.

In a second aspect, the invention may broadly be said to consist in a filtration apparatus having a fluid inlet, a filtered fluid outlet, a residue outlet, and a filtering element which is situated between the fluid inlet and the filtered fluid outlet, and the apparatus also having at least one rotatable member, the rotatable member or members being configured individually, or in combination, as a centrifugal impellor and as a wiping member adapted to wipe the surface of the filtering element.

In a third aspect, the invention may broadly be said to consist in a processing plant incorporating at least one filtration apparatus substantially as specified herein.

Preferably the processing plant includes a pumping means adapted to pump a fluid through the fluid inlet and toward the filtering element.

Preferably the processing plant includes an auguring means to remove residue from the residue outlet.

Preferably the processing plant is a juice processing plant.

In a fourth aspect, the invention may broadly be said to consist in a method of filtering a fluid including the steps of;
creating a swirl within a pressurised fluid within a filtering chamber which includes a filtering element,
using a wiping member to wipe any residue that collects on the filtering element off the filtering element, and
extracting the wiped residue from the filtering chamber and through a residue outlet and collecting the residue separately from any filtered fluid.

Preferably the method further includes extracting the wiped residue through a valve means.

Preferably the residue is pushed through the residue outlet or valve means by the wiping member.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

DESCRIPTION

Figure 3:
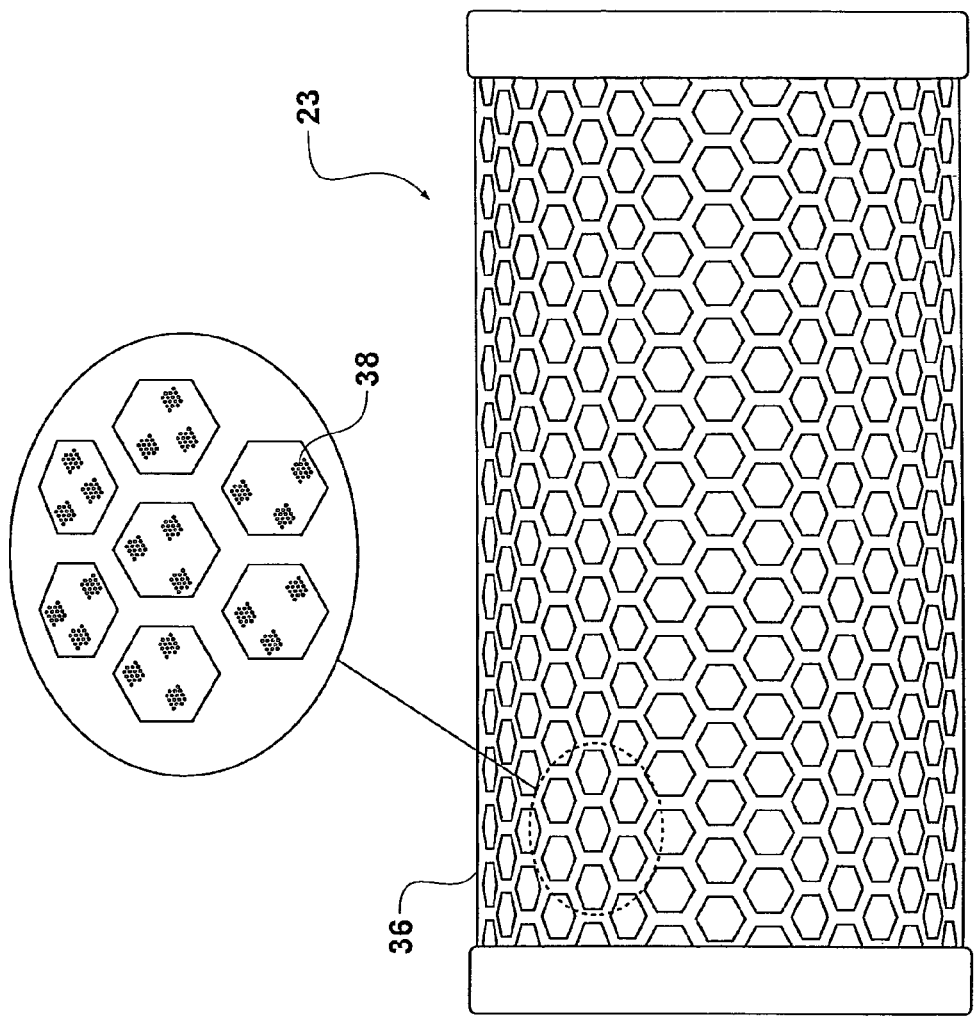
Figure 3A:
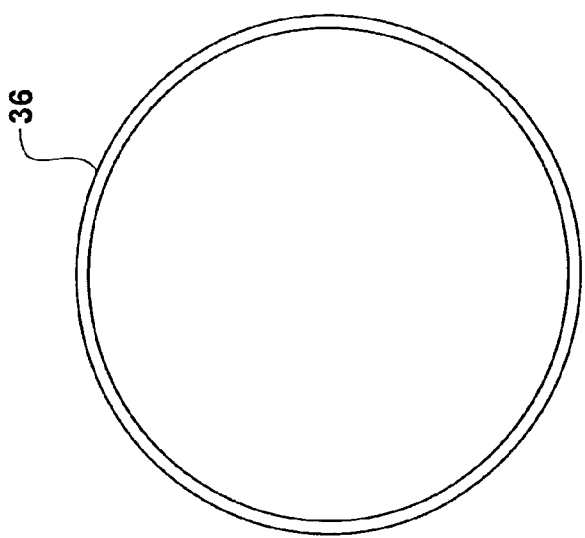
Figure 6:
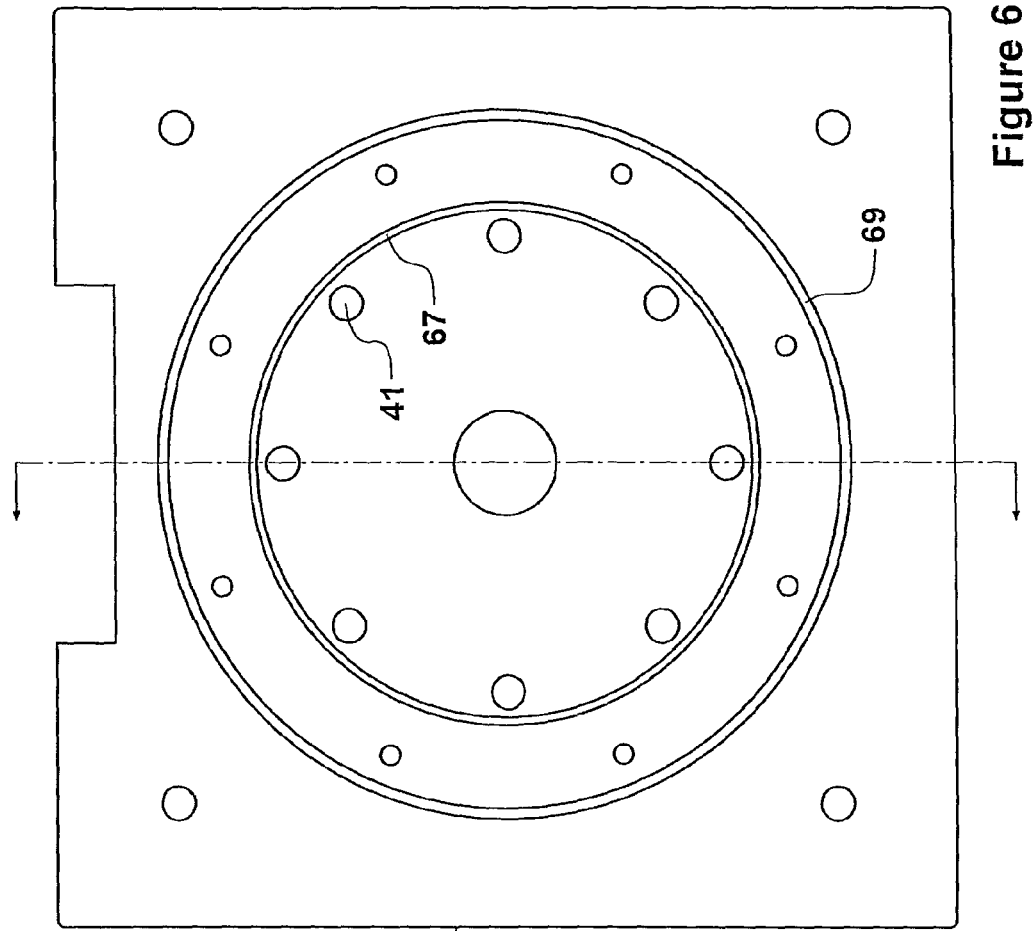
Figure 6B:
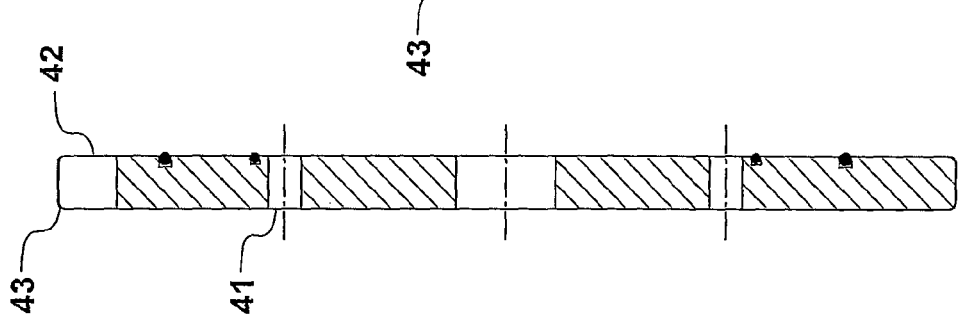
Figure 6A:
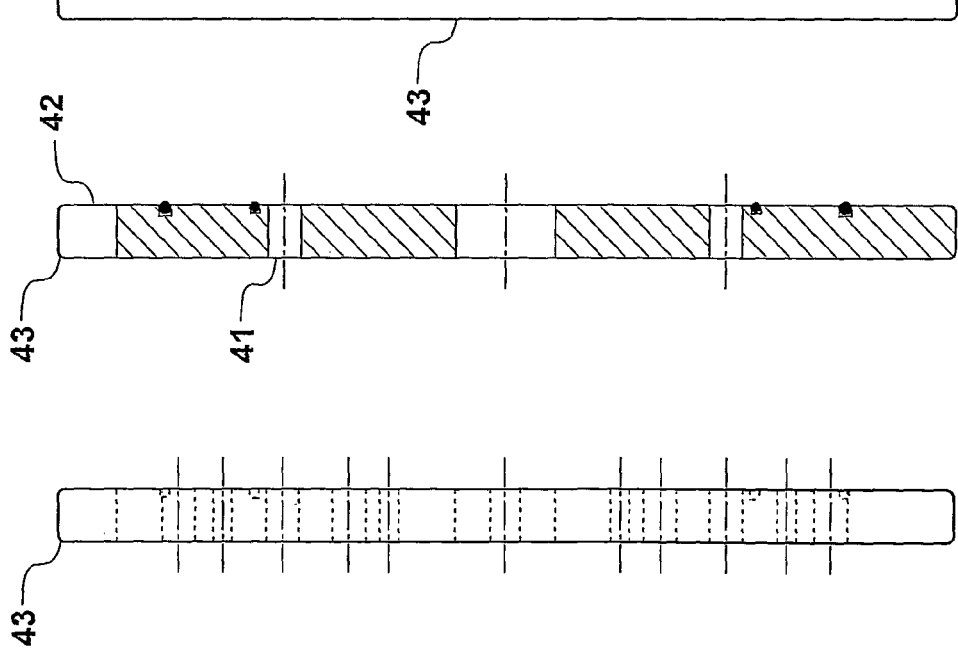

Further aspects of the present invention will become apparent from the following description which is given by way of example only and with reference to the accompanying drawings in which:

FIG. 1 is a partially cutaway side elevation view of a filtration apparatus according to the present invention shown situated within a processing plant, FIGS. 2, 2A and 2B are side, front and rear elevation views respectively of a wiping member of the filtration apparatus, FIGS. 3 and 3A are side and rear elevation views respectively of a filtering element of the filtration apparatus, FIG. 4 is a side elevation view of the wiping member and the filtering element and showing their relative sizes and method of assembly, FIG. 5 is a side elevation composite view showing the wiping member fitted within the filtering element, FIGS. 6, 6A and 6B are front elevation, side elevation, and cross sectional views respectively of a bulkhead which includes a plurality of residue outlets, FIG. 7 is a front elevation view of the bulkhead showing an outlet guide fitted to it, FIG. 8 is a side elevation view of a rear section of the filtration apparatus and showing an auguring means fitted to it, FIG. 9 is a rear elevation view of a section of the filtration apparatus and showing reside collecting on an interior surface of the filtering element and being wiped by the wiping member while fluid is passing though the filtering element, and FIG. 10 is a side elevation view of a section of the filtration apparatus and showing reside being wiped by the wiping member toward the rear end of the filtering element and out through a passage in a rotatable valve member which forms an end of the wiping member.

Note: references herein to front elevation views of the filtration apparatus, or parts of it, indicate views from the fluid inlet end, or right hand end, of the apparatus as shown in FIG. 1.

With reference to FIGS. 1 to 5, a filtration apparatus (11) is shown as part of a small processing plant (13). The plant (13) shown is configured for processing liquids such as fruit juices, and in particular to separate fruit pulp and other solids from fruit juices. A specific application of such a plant (13) is for the filtration of wine juices prior to fermentation in the wine industry.

The filtration apparatus (11) has a filtration chamber (12). The filtration chamber (12) has a fluid inlet (15) at its front end (17), a filtered fluid outlet (19) and a residue outlet (21). The filtration apparatus (11) also has a filtering element (23) which is situated within the filtration chamber (12) and between the fluid inlet (15) and the filtered fluid outlet (19). In this example, the filtering element (23) defines the filtering chamber (12) of the apparatus (11).

In addition the filtration apparatus (11) has a wiping member (25) situated within the filtering element (23). The wiping member (25) is adapted to wipe the internal surface of the filtering element (23) and to wipe residue toward the residue outlet (21) when the apparatus (11) is in use.

The processing plant (13) also includes a first pumping means (27) which is adapted to pump a fluid through the fluid inlet (15) and toward the filtering element (23). The pumping means is driven by an electric motor (29) which, via a common shaft, also drives the wiping member (25). The pumping means (27) can be any suitable pump, for example a centrifugal pump or an axial flow impeller.

In this example, the processing plant (13) also includes an auguring means (31) to help remove any extracted residue from the residue outlet (21).

The apparatus (11) further includes a second pumping means, or a fluid directing means (33), which is adapted to induce swirling of a fluid within the filtering chamber (12) when the apparatus (11) is in use. The fluid directing means (33) can be a centrifugal impellor, or an axial flow impellor, for example. The fluid directing means (33) is configured to cause a counter-flow of fluid back toward the pumping means (27).

However, since the pumping means (27) has a greater pumping capacity than the fluid directing means (33), the resultant fluid flow is still into the filtration chamber (12) of the apparatus (11). The resultant fluid flow causes the fluid and any entrained solids to be continuously agitated and to be directed toward or past the filtering element (23).

The filtering element (23) is cylindrical in shape and the wiping member (25) is a substantially helically shaped wiper blade (35). The wiping member (25) is rotatable about an axis that is common with a central axis of the filtering element (23).

The filtering element (23) comprises a cylindrical external frame (36) which supports a stainless steel fine mesh screen (38), a suitable size of the mesh would be in the range of 0.2 to 0.6 microns (micrometers), and preferably in the range of 0.3 to 0.5 microns, or approximately 0.4 microns.

In the example shown, the wiping member (25) comprises the helically shaped wiper blade (35), a shaft (37), and four series of four curved blades (39). The curved blades (39) extend from the shaft (37) and support the helically shaped wiper blade (35) on their tips. The wiping member (25), in this example, is approximately 200 millimeters (mm) in diameter, and is approximately 300 mm long, and rotates at approximately 1200 rpm when in use.

In this example, the curved blades (39) are in the form of axial flow impeller vanes that are configured to drive the fluid back toward the pumping means (27). Since the curved blades (39) are not able to overcome the pressure created by the pumping means (27) they produce something of an agitating action and ensure that the solids entrained in the fluid travel to the filtering element (23).

It is envisaged that a filtration apparatus (11) of this size will be able to process approximately 5000 liters of juice per hour. This compares with a typical capability of approximately 700 liters per hour using existing technology of a similar size.

With reference to FIG. 6 it can be seen that in this example the residue outlet (21) includes eight restrictor orifices (41) or outlet holes. The orifices (41) are sized or configured to allow residue to exit through them, while maintaining a pressure within the fluid within the filtering element (23). The orifices (41) are formed in an aft bulkhead (43) of the apparatus (11). Fluid can enter the cylindrical shaped filtering element (23) from the forward end (17), and the aft bulkhead (43) closes off the aft end of the filtering element (23).

The residue outlet (21) is provided with a valve means (45) which is adapted to control the flow of residue out through the outlet (21) when the apparatus (11) is in use. The valve means (45) includes a rotatable valve member (47) which is in sliding and sealing contact with a forward face (42) of the aft bulkhead (43). The rotatable valve member (47) includes a passage (49) which is adapted to communicate with the orifices (41) of the residue outlet (21), when alignment of the passage (49) with an orifice (41) occurs.

When the apparatus (11) is operating, the rotatable valve member (47) rotates as it is a part of the wiping member (25). During each rotation of the rotatable valve member (47) the passage (49) will be briefly aligned with each of the orifices (41) in turn. The brief alignment allows a small amount of the wiped residue to exit through the residue outlet (21) via the orifices (41). In this way, the exit out of the filtering chamber can be said to be controlled by a rotary valve.

During the times that the passage (49) is not aligned with any or the orifices (41), the residue outlet (21) is closed. During these intervals when the residue outlet (21) is closed, the pressure within the filtering element (23) can be maintained at a desired level for efficient operation of the filtration apparatus (11). The pressure within the filtering element (23) could tend to fluctuate slightly, dropping momentarily each time the passage (49) aligns with one of the orifices (41). It is for this reason that the orifices (41) should be carefully sized to minimise the pressure drop while still allowing the residue to be cleared from the filtering element (23).

The apparatus (11) can be used in a method of filtering a fluid which includes the steps of;
  creating a swirl within a pressurised fluid within the filtering chamber (12),
  using the wiping member (25) to wipe any residue that collects on the filtering element (23) off the filtering element (23), and
  extracting the wiped residue through the residue outlet (21) and collecting the residue separately from any filtered fluid.

The wiped residue is extracted from the filtering chamber through the valve means (45).

The residue is pushed through the residue outlet (21) or valve means (45) by the wiping member (25), and by the pressure within the filtering element (23) that is produced by the pumping means.

The plant (13) includes a balance tank (51) from which fluid can be supplied via an inlet duct (53) toward the fluid inlet (15) of the filtration apparatus (11). The pumping means (not shown) is situated within the inlet duct (53).

Filtered fluid which has passed through the filtering element (23) is collected within a filter housing (55) which surrounds it, and can flow out through the filtered fluid outlet (19), and away via a pipe (57) to a collection tank (59). Residue which is held back by the filtering element (23) is directed away from the filtering element (23) by the wiping member (25), out through the residue outlet (21), and is transported by the auguring means (31) and is deposited in a collection bucket (61).

In this example, the outlet end of the auguring means (31) is provided with a pressure relief valve (65). Restricting the flow of residue through the pressure relief valve (65) can help to maintain a back pressure within the flow of residue, further helping to maintain pressure within the filtering element (23).

The aft bulkhead (43) includes two circular grooves. An inner groove (67) is used to support the filtering member (23), and an outer groove (69) is used to support the filter housing (55). Tie rods (71) are used to secure the aft bulkhead (43) to an inlet housing (73), and to clamp the filtering member (23) and the filter housing (55) between them.

With reference to FIGS. 7 and 8 a conical shaped residue collector manifold (63) is shown. The manifold (63) includes eight passages, each of which communicates with one of the orifices (41). The manifold (63) directs residue which floes out through the orifices (41) toward the auguring means (31).

With reference to FIGS. 9 and 10, the collection of residue and the wiping of the residue can be seen in enlarged detail. The fluid is swirled by the curved blades (39), and centrifugal forces tend to make the heavier solids and pulp migrate toward the filtering element (23). Filtered liquid, or other fluid, passes though the filtering element (23).

The residue, or solids, which cannot pass though the filtering element (23) are scraped across the surface of the filtering element (23), and toward the residue outlet (21), by the wiper blade (35). The residue, or solids, then pass along the passage (49) in the rotatable valve member (47) and a small amount of the residue can be expelled out through the orifices (41), each time the end of the passage (49) passes one of the orifices (41). The passing of the residue, or solids, along the passage (49) is assisted by any or all of the following; (i) the rotating motion of the rotatable valve member (47), (ii) the wiping action of the wiper blade (35), and (iii) the fluid pressure within the filtering element (23).

As the wiper blade (35) passes over the surface of the filtering element (23) it substantially clears the surface of the filtering element (23) and improves the flow of fluid through the filtering screen (38).

VARIATIONS

Aspects of the present invention have been described by way of example only and it should be appreciated that modifications and additions may be made thereto without departing from the scope thereof.

In the example described above, the filtration apparatus (11) includes a wiping member (25) which is situated within the filtering element (23), and the wiping member (25) is adapted to wipe the internal surface of the filtering element (23). It is envisaged that in an alternative embodiment, the wiping member could be situated about the filtering element, and could wipe an external surface of the filtering element. In such an alternative embodiment the fluid flow would be from the outside of the filtering element and toward its inside.

In the example described above, the filtering element (23) is cylindrical in shape. In is envisaged that in alternative embodiment the filtering element (23) could be conical in shape.

In the example described above, the residue outlet (21) includes eight orifices. It is envisaged that an alternative embodiment could use one, or any suitable number of orifices. In addition, it is envisaged that the size of the orifice or orifices could be variable, for example to be able to control the back pressure within the filtering element and to allow a wide range of fluids to be filtered using the apparatus (11).

Similarly, the wiping member (25) can include more than one wiper blade (35), and/or the rotatable valve member (47) can include more than one passage (49).

In the example described the apparatus (11) is described primarily as being configured to remove solids from a liquid with the purpose of achieving a higher quality liquid with minimal solids. However, the same apparatus can also be used in a dewatering situation, where the purpose is to remove unwanted liquid to achieve solids with a liquid (or water) content that is as low as possible. For example, the apparatus (11) could be used to dewater sewage sludge, effluent or wood pulp.

DEFINITIONS

Throughout this specification the word "comprise" and variations of that word, such as "comprises" and "comprising", are not intended to exclude other additives, components, integers or steps.

ADVANTAGES

Thus it can be seen that at least the preferred form of the invention provides a filtration apparatus which is able to filter large volumes of fluid, which contains a large percentage of solids, for extended periods of time on a continuous basis, without requiring frequent cleaning or back flushing. The use of the wiper blade in conjunction with the controlled release of the residue/solids from the apparatus allows filtration to continue efficiently for extended periods of time.

The invention claimed is:

1. A filtration apparatus comprising:
   a filtration chamber having a fluid inlet, a filtered fluid outlet, and a residue outlet;
   a conical or cylindrical shaped filtering element situated between the fluid inlet and the filtered fluid outlet, said filtering element having a central axis;
   a first pumping means configured to create a flow toward the filtration chamber, and a second pumping means situated within the filtration chamber and configured to induce a swirling counter-flow back toward the first pumping means when the apparatus is in use;
   a shaft aligned with the central axis, the second pumping means comprising curved blades mounted on the shaft and extending radially outward from the shaft; and
   a wiping member comprising at least one substantially helically-shaped wiper blade situated radially from the shaft between the curved blades and the filtering element, the wiping member supported on one or more tips of the curved blades and configured to wipe the surface of the filtering element and to wipe residue toward the residue outlet when the apparatus is in use.

2. The filtration apparatus as claimed in claim 1, wherein the filtering element includes a fine mesh screen.

3. The filtration apparatus as claimed in claim 1, further including a rotary valve configured to control the flow of residue out of the filtering chamber.

4. The filtration apparatus as claimed in claim 1, wherein the residue outlet includes one or more restrictor orifices that are sized to allow residue to exit through said restrictor orifices while maintaining a pressure within the filtering chamber.

5. A filtration apparatus comprising:
   a filtration chamber having a fluid inlet, a filtered fluid outlet, and a residue outlet;
   a filtering element situated between the fluid inlet and the filtered fluid outlet, said filtering element having a central axis;
   a first pump configured to create a flow toward the filtration chamber, and a second pump within the filtration chamber and configured to induce a swirling counter-flow back toward the first pump when the apparatus is in use;
   a shaft aligned with the central axis, the second pump comprising curved blades mounted on the shaft and extending radially outward from the shaft; and
   a wiping member comprising at least one substantially helically-shaped wiper blade spaced radially from the shaft between one or more tips of the curved blades and the filtering element, the wiping member supported on one or more of the tips of the curved blades and configured to wipe the surface of the filtering element and to wipe residue toward the residue outlet when the apparatus is in use.

* * * * *